United States Patent
Ladouceur

(10) Patent No.: US 8,851,457 B2
(45) Date of Patent: Oct. 7, 2014

(54) LOW-TURBULENT AERATOR AND AERATION METHOD

(76) Inventor: Richard Ladouceur, Hornby Island (CA)

( * ) Notice: Subject to any disclaimer, the term of this patent is extended or adjusted under 35 U.S.C. 154(b) by 189 days.

(21) Appl. No.: 13/044,073

(22) Filed: Mar. 9, 2011

(65) Prior Publication Data

US 2012/0230145 A1    Sep. 13, 2012

(51) Int. Cl.
*C10J 1/18* (2006.01)
*B01F 3/04* (2006.01)

(52) U.S. Cl.
CPC ..... *B01F 3/04609* (2013.01); *B01F 2003/0456* (2013.01); *B01F 2003/04645* (2013.01)
USPC ............. 261/93; 210/208; 210/220; 366/270; 261/84

(58) Field of Classification Search
CPC .................................................. B01F 3/04531
USPC ................. 261/77, 84, 93; 210/205–208, 220; 366/262, 270
See application file for complete search history.

(56) References Cited

U.S. PATENT DOCUMENTS

| | | | | |
|---|---|---|---|---|
| 366,991 | A * | 7/1887 | Andrews | 261/89 |
| 2,293,183 | A * | 8/1942 | Walker | 261/93 |
| 2,865,618 | A * | 12/1958 | Abell | 261/93 |
| 3,210,053 | A * | 10/1965 | Boester | 261/6 |
| 3,662,890 | A * | 5/1972 | Grimshaw | 210/195.1 |
| 3,778,233 | A * | 12/1973 | Blough et al. | 422/225 |
| 4,166,086 | A * | 8/1979 | Wright | 261/93 |
| 4,242,199 | A * | 12/1980 | Kelley | 210/758 |
| 4,251,371 | A * | 2/1981 | Bauer et al. | 210/197 |
| 4,341,641 | A * | 7/1982 | Novak | 588/320 |
| 4,412,924 | A * | 11/1983 | Feather | 210/744 |
| 4,732,682 | A * | 3/1988 | Rymal | 210/620 |
| 5,194,144 | A | 3/1993 | Blough | |
| 5,264,130 | A * | 11/1993 | Etlin | 210/626 |
| 5,366,698 | A * | 11/1994 | Smith et al. | 422/168 |
| 5,620,602 | A * | 4/1997 | Stuth | 210/608 |
| 6,884,353 | B2 | 4/2005 | Hoage et al. | |
| 7,306,722 | B1 | 12/2007 | Hoage | |
| 7,651,075 | B2 | 1/2010 | Rho et al. | |
| 2001/0040125 | A1 * | 11/2001 | Wada et al. | 210/195.3 |
| 2005/0167858 | A1 * | 8/2005 | Jones et al. | 261/28 |
| 2009/0272689 | A1 * | 11/2009 | Ladouceur | 210/615 |

* cited by examiner

*Primary Examiner* — David Sorkin
*Assistant Examiner* — Abbas Rashid
(74) *Attorney, Agent, or Firm* — Davis & Bujold, PLLC; Michael J. Bujold

(57) ABSTRACT

A low-turbulent aspirating type aerator, introduced into a body of liquid, comprising of: a gas conveyance tube having a gas inlet end and a gas outlet end; a gas-liquid mixture chamber incorporating; an impeller affixed to a rotatable shaft, at the least one gas intake opening and at the least one gas-liquid discharge opening at or near bottom end of gas-liquid mixture chamber.
Rotation of the impeller creates a low-pressure zone (vacuum) allowing gas conveyed via gas conveyance tube to come into contact with rotating impeller forming a gas-liquid mixture at the impeller interface wherein bubbles are formed. Gas-liquid mixture chamber confines gas bubbles thereby allowing the action of impeller and liquid shearing force to produce and discharge micro-sized gas bubbles of predominantly less than 0.85 millimeters. The micro-sized gas bubbles generated have an long residence or gas hold up time within the body of liquid, wherein gas within bubble can, based on a concentration gradient, diffuse into liquid thereby providing the capacity to provide a high gas (oxygen) transfer rate.

9 Claims, 5 Drawing Sheets

LOW-TURBULENT AERATOR AND AERATION METHOD

FIELD

The present disclosure relates to a vertically oriented aspirating type low-turbulent aerator and an aeration method for supporting aquatic environments by maintaining dissolved oxygen requirements. The aerator and aeration method can be incorporated into many applications such as in: aquaculture, aeroponics and hydroponics as well as lagoon, sewage and water treatment.

BACKGROUND

Dissolved oxygen (DO) is an essential requirement to maintain viable biochemical processes required for water treatment and in maintaining healthy aquatic environments.

There exist today a plenitude of aeration devices (aerators) and aeration methods, principally evolved from and designed for applications within the field of wastewater treatment. Many of these aeration devices and methods have been introduced into other fields of application such as aquaculture for supplying the requirements of dissolved oxygen. Aerators in addition to providing a source of oxygen to be transferred into water also induce turbulent mixing. This turbulent mixing action can in certain applications result in adverse complications, along with increased energy consumption, operational and maintenance needs with a subsequent increase in overall cost.

The two principle types of processes employed for aeration are subsurface aeration and surface aeration. Each type has a number of technologies and variants that perform the task of transferring air into water.

Subsurface or pressure aeration employs a blower or compressor to deliver oxygen under pressure to some form of air transferring device located at a specified depth within the water column. Bubbles that are formed under pressure ascend quickly and generate mixing conditions within the water column. Because pressurized bubbles rise to surface quickly it becomes imperative that pressure type aerators are placed at a sufficient depth within the water column in order to provide adequate gas transfer.

Surface or mechanical aeration, involves rigorous surface agitation forming a water spray of small water droplets wherein oxygen is transferred into the water.

Aspirating type mechanical aerators introduce oxygen into the water by drawing atmospheric air through a draft tube or gas conveyance tube via the action of a rotating propeller. The action of the propeller creates a highly turbulent mixing environment that maintains particles to be in suspension. Propeller type aspirating aerators typically are positioned within the water at a depth between 60 to 120 centimeters and placed at an angle between 25 and 30 degrees.

Other aspirating type aerator variants, which are incorporated below for reference, have been introduced recently they are vertically oriented, partially submerged typically to a depth ranging from 20 to 50 centimeters and are equipped with the impeller positioned adjacent to the bottom bubble discharge end of aerator.

U.S. Pat. No. 6,884,353 B2, Jerard B Hoage, discloses an aeration apparatus to produce small bubbles for use in a septic tank and the like, comprising of an orifice plate having small holes and slots within the air transfer tube and above the impeller.

U.S. Pat. No. 7,306,722 B1, Jerard B Hoage, discloses an aeration apparatus to create small bubbles for use in industrial type wastewater that comprises a rotating disc having louvered openings.

U.S. Pat. No. 7,651,075, Samuel S Rho and Jae-Hak Eorn, discloses an aeration apparatus to produce small air bubbles for use in septic tank wastewater and comprises an aeration disk having angle blades and incorporating an arcuate wall having several slots.

The operating principles of the prior art aspirating type aerators referenced above are similar and rely upon a rotating impeller to produce an area of lower pressure or vacuum allowing atmospheric gas to be drawn into contact and mixed with liquid.

Bubble formation is a product of high shear forces from the rotating impeller. As gas is drawn into the liquid the air-liquid mixture is subject to the shearing forces imparted by the rotating impeller where bubbles are formed at the trailing edge. These bubbles will vary in diameter and are subject to bubble coalescence when discharged, wherein bubbles unite to form larger bubbles that will ascend quickly and reduce gas-hold up or residence time. When the ratio of large bubbles, greater than 1 millimeter in diameter, are high the bubbles generate an uplifting effect as well as changing the liquid density wherein fine to micro sized gas bubbles will rise at a faster rate. This creates the need to have increased gas input volume to offset the loss of oxygen discharged to the atmosphere at the liquid gas boundary thereby reducing aeration efficiency.

The position of the impeller (aeration disk—Rho and Eom), of the prior arts, adjacent to bottom end of the aerator produces a large percentage of gas bubbles that are predominantly greater than one millimeter in diameter having a high ascent rate. A high percentage of quickly ascending bubbles will cause small bubbles of predominantly less than 1 mm in diameter to rise at a higher ascent rate thereby reducing their residence time. In addition the proximity of the impeller at the bottom end of aerator generates radial and helical turbulence that is transferred directly into the liquid body. In the event the aerator is placed within a liquid body containing large amounts of solids there is an increased potential of debris entering the impeller.

It therefore becomes apparent that improvements are required with respect to vertical aspirating aerators wherein aeration efficiency, bubble residence time are increased, turbulent energy transfer is reduced and impeller impacts are prevented.

SUMMARY

There is described an aspirating type low-turbulent aerator introduced into a body of liquid and comprising of: an air transfer tube having a gas inlet end and a gas outlet end; a gas-liquid mixture chamber incorporating; at least one impeller affixed to a rotatable shaft, at the least one gas intake opening and at the least one gas-liquid discharge opening at or near bottom end of gas-liquid mixture chamber.

Rotation of the impeller creates a low-pressure or vacuum zone allowing gas to be drawn into rotating impeller, whereby bubbles are formed at the trailing edge of impeller. Gas-liquid mixture chamber confines gas bubbles thereby allowing the action of impeller shearing force to produce micro-sized gas bubbles of predominantly less than 0.85 millimeters that are discharged into the surrounding liquid body with minimum turbulence. The micro-sized gas bubbles generated have an long residence or gas hold up time within the body of liquid, wherein gas within bubble can, based on a concentration gradient, diffuse into liquid thereby providing the capacity to provide a high gas (oxygen) transfer rate.

There is also described an aeration method wherein a liquid conveyance conduit is incorporated in combination with aerator. Liquid conveyance conduit can convey liquid directly into the gas-liquid mixture chamber via a liquid intake or into a liquid transfer conduit positioned below and proximal to bottom of aerator. The method in combination with aerator can increase oxygen transfer via the introduction of liquid having a lower dissolved oxygen concentration as well as providing a method of controlled non-aggressive mixing.

BRIEF DESCRIPTION OF DRAWINGS

These and other features will become more apparent from the following description in which reference is made to the appended drawings, the drawings are for the purpose of illustration only and are not intended to be in any way limiting, wherein:

FIG. 1-A illustrates a cross-sectional bottom view of impeller

DETAILED DESCRIPTION

Figures 1, 1A:
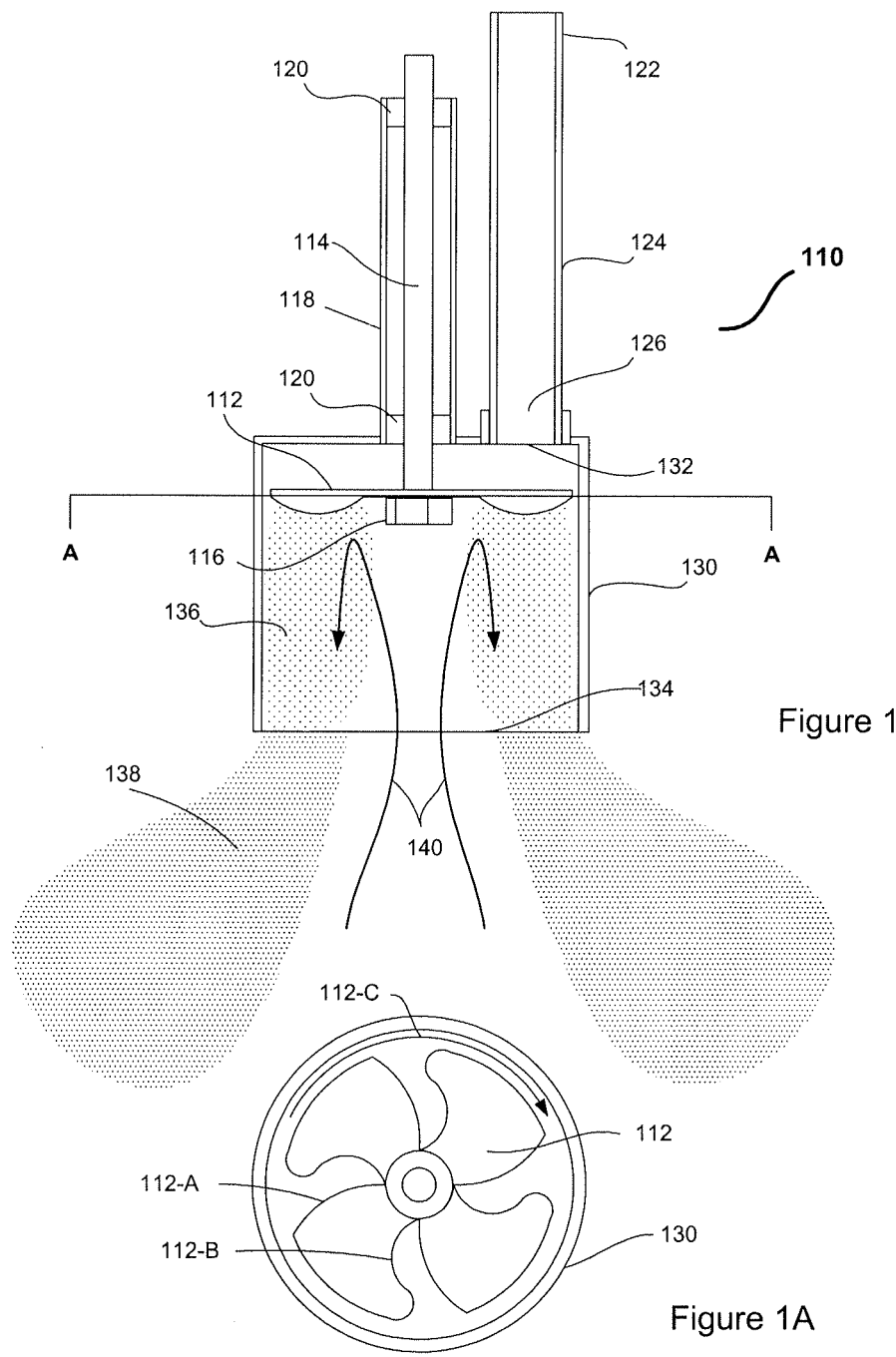
FIG. 1 illustrates a sectional side view of aerator

FIGS. 1 and 1-A illustrates aerator 110 and impeller 110-a wherein the rotation of impeller 112 housed within gas-liquid mixture chamber 130 produces a low-pressure zone or vacuum that draws gas introduced into gas inlet end 122 of gas conveyance tube 124 such that gas is brought into contact with impeller 112 via gas intake opening 132 in communication with gas outlet end 126.

Shaft 114 is housed within shaft protection sleeve 118 and supported via shaft bearing bushings 120. Shaft 114 intersects upper end of gas-liquid mixture chamber 130 and impeller 112 is attached to shaft 114 via attachment nut 116.

Rotation of shaft 114 can be via a variety of submerged or non-submerged motive means such as an electric, hydraulic or pneumatic motor powered by grid, solar or hybrid energy source. Additionally rotation can be continuous or intermittent.

Rotation of impeller 112 creates a gas-liquid mixing zone at the interface of the impeller wherein leading edge of impeller 112-A generates a shearing force that moves gas-water mixture to move across top and bottom surfaces whereby bubbles are formed at the trailing edge 112-B of impeller.

The bubbles are then forced downward in a radial and helical motion within gas-liquid chamber 130 where liquid 140 drawn into gas-liquid mixture chamber 130 is of a greater pressure than the internal pressure of the formed gas bubbles.

The gas-mixture chamber 130 allows bubbles 136 to be confined within the gas-mixture chamber 130, wherein the increased shearing action of impeller 112 and incoming liquid 140 produce micro-sized gas bubbles of predominantly less than 0.85 mm to be ultimately discharged from gas discharge opening 134 of gas-liquid chamber 130.

Gas introduced into gas inlet end 122 of gas conveyance tube 124, as described above, is not limited to only atmospheric gas and alternatively gas supplied can be pressurized and introduced into gas conveyance tube 124 at gas inlet end 122 such that the vacuum induced via rotating impeller 112 draws the introduced gas to come into contact with impeller 112 via gas intake opening 132 of gas-liquid mixture chamber 130.

Figure 2:
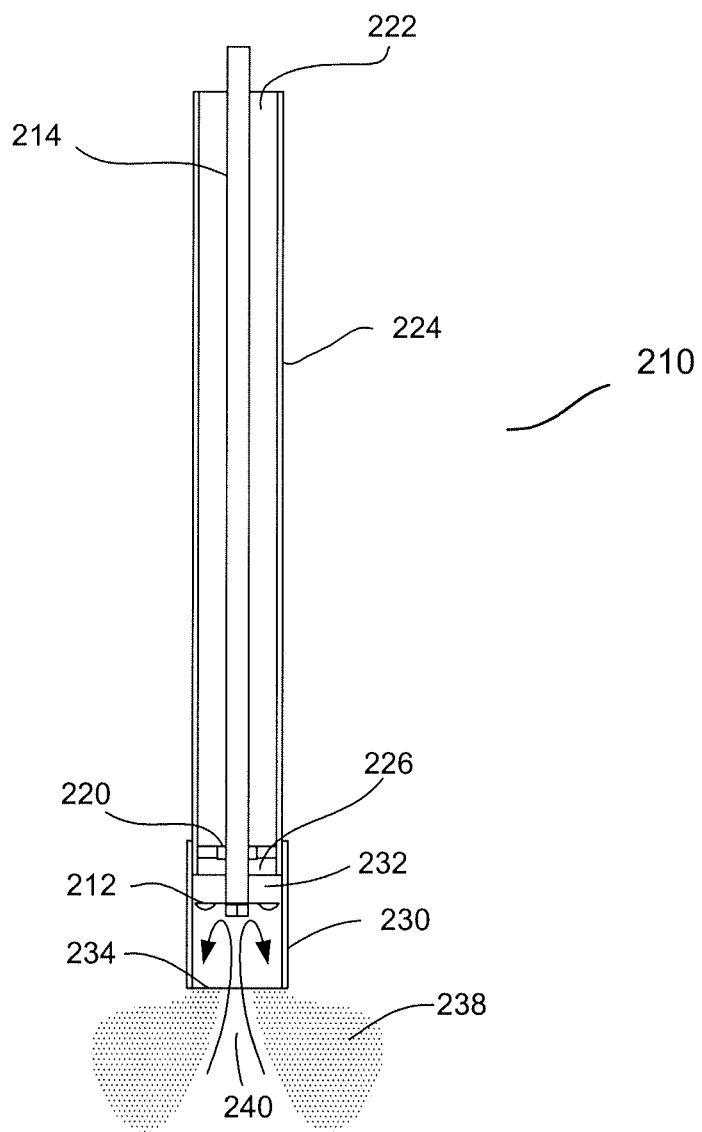
FIG. 2 illustrates a sectional side view of aerator that incorporates impeller shaft within gas conveyance tube

FIG. 2 illustrates aerator 210, which is a variant of aerator 110, wherein gas conveyance tube 224 comprising of a rigid tube and incorporating internally: impeller 212, shaft 214, and shaft support bushing 220.

Gas drawn into or introduced into gas conveyance tube 224 is drawn into contact with impeller 212 via gas intake opening 232 in communication with gas outlet end 226.

The gas-mixture chamber 230 allows bubbles to be confined within gas-liquid chamber 230, wherein the shearing forces of impeller 212 and incoming liquid 240 produce micro-sized gas bubbles of predominantly less than 0.85 mm to be ultimately discharged from gas discharge opening 234 of gas-liquid chamber 230.

Rotation of shaft 214 can be via a variety of submerged or non-submerged motive means such as an electric, hydraulic or pneumatic motor powered by grid, solar or hybrid energy source. Additionally rotation can be continuous or intermittent.

Gas introduced into gas inlet end 222 of gas conveyance tube 224, as described above, is not limited to only atmospheric air and alternatively gas supplied can be pressurized and introduced into gas conveyance tube 224 at gas inlet end 222 such that the vacuum induced via rotating impeller 212 draws the introduced gas to come into contact with impeller 212 via gas intake opening 232 of gas-liquid mixture chamber 230.

Figure 3:
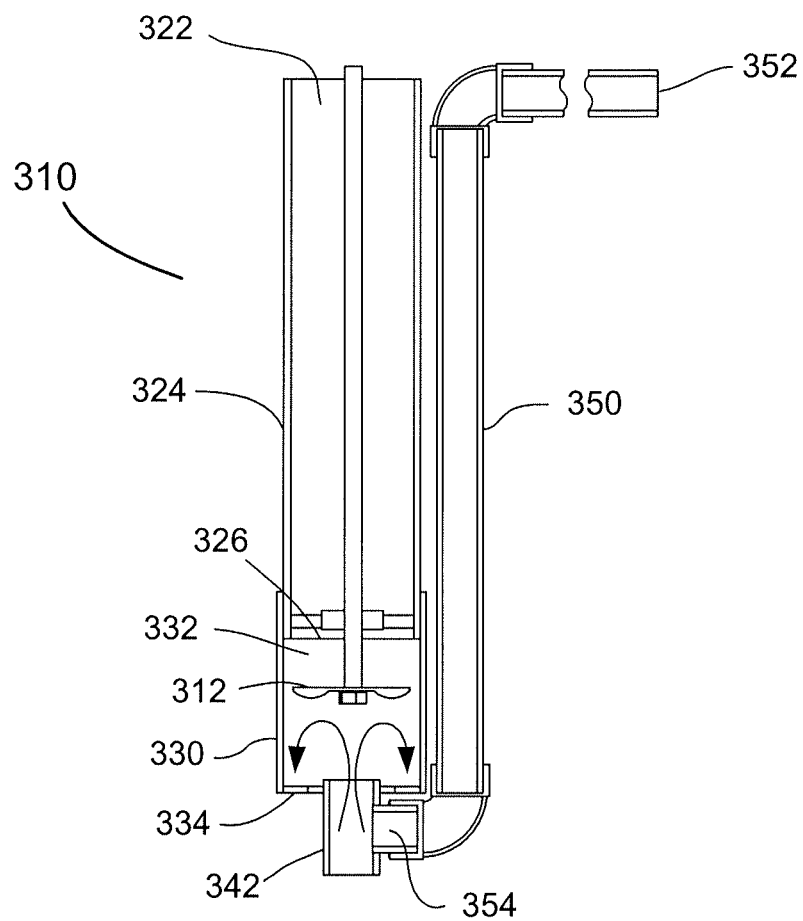
FIG. 3 illustrates a sectional view of aeration method in combination with liquid conveyance conduit connected to liquid intake fitting intersecting bottom end of gas-liquid mixture chamber.

FIG. 3 illustrates a sectional view of aeration method; wherein aerator 310 is operated in combination with a liquid conveyance conduit 350 that comprises a liquid inlet end 352. Liquid inlet end 352 can be connected to a liquid conveyance pump (not shown) that introduces liquid into liquid conveyance conduit 350 such that conveyed liquid discharges from liquid conveyance outlet end 354 into liquid intake opening 342 of gas-liquid mixture chamber 330. The liquid can be a liquid having low dissolved oxygen, low total solids and/or contain bio-augmentation, biocatalysts and/or soluble ionic compounds.

Operation of aerator 310 functions similarly as that of aerator 210 illustrated and described in FIG. 2 wherein, rotation of impeller 312 housed within gas-liquid mixture chamber 330 produces a vacuum that allows gas introduced into gas inlet end 322 of gas conveyance tube 324 to be brought into contact with impeller 312 via gas intake opening 332 in communication with gas outlet end 326.

The gas-mixture chamber 330 allows bubbles to be confined within gas-liquid chamber 330, wherein the shearing forces of impeller 312 and incoming liquid 340 produce micro-sized gas bubbles of predominantly less than 0.85 mm to be ultimately discharged from gas discharge opening 334 of gas-liquid chamber 330.

Rotation of shaft 314 can be via a variety of submerged or non-submerged motive means such as; an electric, hydraulic or pneumatic motor powered by grid, solar or hybrid energy source. Additionally rotation can be continuous or intermittent.

Gas introduced into gas inlet end 322 of gas conveyance tube 324, as described above, is not limited to only atmospheric air and alternatively gas supplied can be pressurized and introduced into gas conveyance tube 324 at gas inlet end 322 such that the vacuum induced via rotating impeller 312 draws the introduced gas to come into contact with impeller 312 via gas intake opening 332 of gas-liquid mixture chamber 330.

Figure 4:
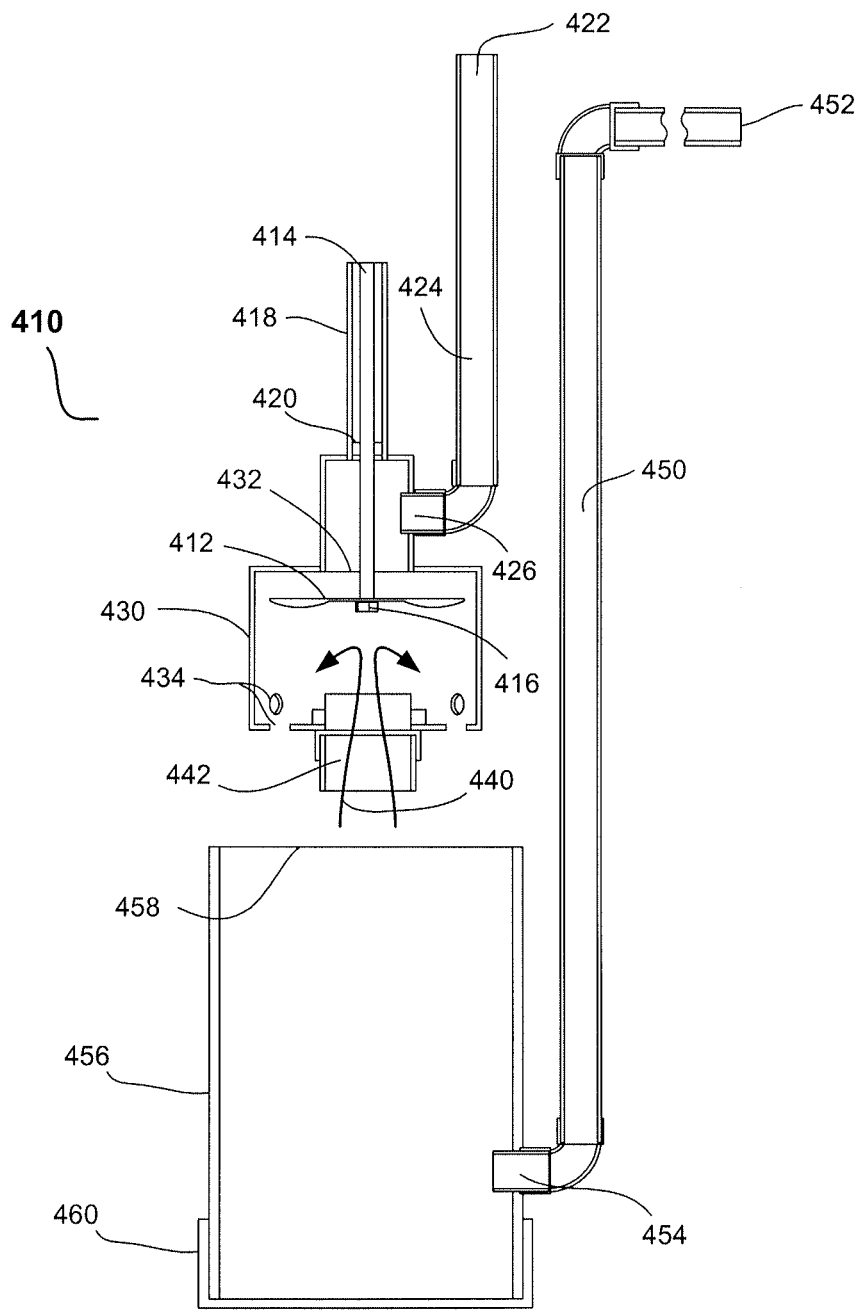
FIG. 4 illustrates a sectional view of aeration method in combination with liquid conveyance conduit connected to liquid transfer conduit positioned proximal to liquid intake fitting intersecting bottom end of gas-liquid mixture chamber.

FIG. 4 illustrates a sectional view of another variant of aeration method wherein aerator 410 is operated in combination with liquid conveyance conduit 450 connected to a liquid transfer conduit 456 positioned below and proximal to bottom of gas-mixture chamber 430.

Liquid conveyance conduit 450 comprises liquid inlet end 452 and a liquid outlet 454 wherein liquid conveyed into liquid conveyance inlet 452 via a conveyance pump (not shown) discharges liquid from liquid conveyance outlet 454 into liquid transfer conduit 456.

Liquid transfer conduit 456 comprises of an open upper end 458 and a closed bottom end 460. Conveyed liquid introduced into liquid transfer conduit 456 is discharged from open upper end 458 whereby liquid is than drawn into liquid intake 442 via a central suction vortex generated via rotation of impeller 412. The liquid can be a liquid having low dissolved oxygen, low total solids and/or contain bio-augmentation, biocatalysts and/or soluble ionic compounds.

Aerator variant 410 is similar to aerator 110 described and illustrated in FIG. 1 wherein gas conveyance tube 424 and shaft 414 are segregated such that each is separately connected and in communication with gas-mixture chamber 430.

Operation of aerator 410 functions similarly as that of aerator 110 illustrated and described in FIG. 1 wherein, shaft 414 housed within shaft protection sleeve 418 is supported via shaft bearing bushing 420. Shaft 414 intersects upper end of gas-liquid mixture chamber 430 and is attached to impeller 412 via attachment nut 416.

Rotation of impeller 412 housed within gas-liquid mixture chamber 430 produces a vacuum that allows gas introduced into gas inlet end 422 of gas conveyance tube 424 to be brought into contact with impeller 412 via gas intake opening 432 in communication with gas outlet end 426.

Gas-mixture chamber 430 allows bubbles produced via rotating impeller 412 to be confined within gas-liquid mixture chamber 430, wherein the shearing forces of impeller 412 and incoming liquid 440 produce micro-sized gas bubbles of predominantly less than 0.85 mm to be ultimately discharged from gas discharge opening 434 at or near bottom end of gas-liquid mixture chamber 430.

Rotation of shaft 414 can be via a variety of submerged or non-submerged motive means such as an electric, hydraulic or pneumatic motor powered by grid, solar or hybrid energy source. Additionally rotation can be continuous or intermittent.

Gas introduced into gas inlet end 422 of gas conveyance tube 424, as described above, is not limited to only atmospheric air and alternatively gas supplied can be pressurized and introduced into gas conveyance tube 424 at gas inlet end 422 such that the vacuum induced via rotating impeller 412 draws the introduced gas to come into contact with impeller 412 via gas intake opening 432 of gas-liquid mixture chamber 430.

Figure 5:
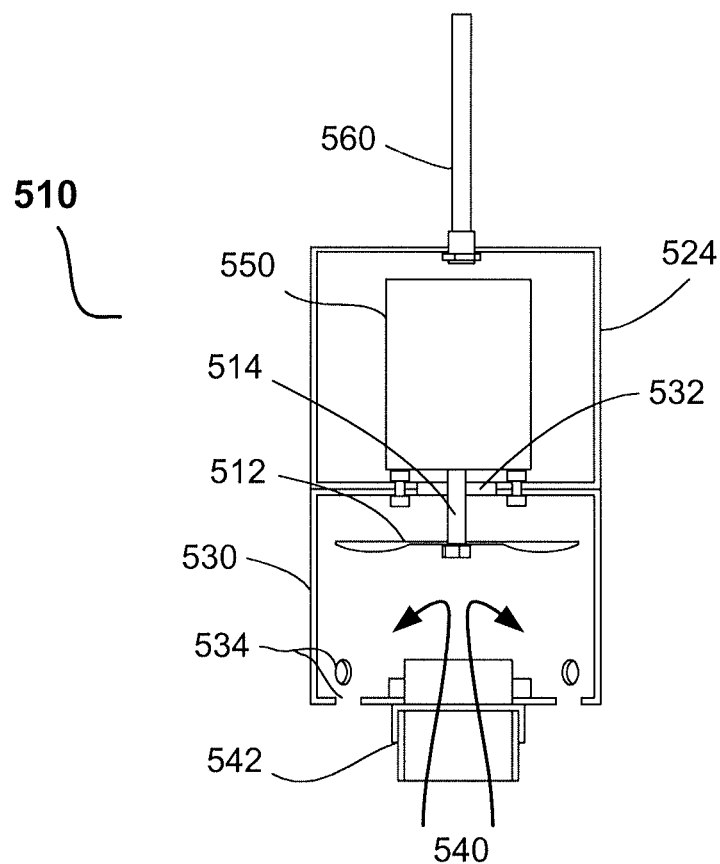
FIG. 5 illustrates a sectional view of fully submerged aerator

FIG. 5 illustrates a sectional view of a fully submerged variant of aerator 510, wherein, as part of one embodiment, a submersible motor 550 is housed within gas intake conduit 524.

Activation of motor 550 rotates impeller 524 via shaft 522, wherein as impeller rotates gas is drawn form gas intake conduit 524 into gas-liquid mixing chamber 530 via gas intake opening 532.

Gas supply into gas intake conduit 524 is via gas conveyance tube 560. Gas conveyance tube 560 can be connected to a blower or air compressor for the supply of pressurized gas into gas intake conduit 524. Gas supply can be continuous or intermittent.

The distance from impeller 524 to gas bubble outlet holes 534 within gas-liquid mixing chamber will determine the dwell or residence time the gas-liquid mixture is under the influence of the impeller shear force. The overall submergence depth of aerator will determine the amount of gas pressure is required.

As micro-sized gas bubbles are discharged from outlet holes 534 liquid 540 is drawn into gas liquid mixture chamber via liquid intake opening 542.

All aeration devices can be measured for their capability of transferring oxygen into a liquid and more specifically water via the following standards of measures:
 a) Oxygen Transfer Rate, which is the measure of mass transfer of oxygen within a specified volume of water over a specified time and
 b) Aeration Efficiency, which includes the energy input (motor current draw) requirements.

Oxygen transfer into water is governed by several parameters. The two most important factors governing oxygen transfer is bubble size and residence time. This can be understood with greater clarity with the following brief description related to bubble size.

The greater interfacial area of smaller bubbles increases the volumetric area of contact with water boundary films, which increases oxygen transfer. Oxygen transfer is affected by density and viscosity wherein rise velocity of gas bubbles is inversely affected. Cold water is denser therefore gas bubble rise velocity is slower and oxygen transfer rate is greater.

Smaller bubble diameter reduces gas bubble rising velocity allowing greater residence or gas hold-up time for the oxygen to dissolve and diffuse. Diffusion increases with temperature rise. The diffusivity of the gas out of the bubble film allows the gas bubble to shrink as it slowly ascends and depending on the bubble diameter and depth within the liquid the gas bubble will collapse releasing the full content of gas.

Another parameter that is important with respect to oxygen transfer is the oxygen concentration difference between oxygen within the gas bubble and that within the liquid body. As the difference in oxygen concentration decreases between gas bubble and liquid oxygen concentration air transfer rate degreases from an aeration device and therefore aeration efficiency is also reduced.

Without imparting complex details and theory of fluid mechanics it should be understood that a self inducing aspirating type aerator is influenced greatly by impeller design: pitch ratio, thrust; radial, axial or combine, shape of leading and or trailing edge, rotation speed and submergence depth.

It has been discovered that an increase in micro-bubble production of less than 0.85 mm, along with, a reduction of helical turbulence is achieved by providing a gas-liquid mixture chamber having a depth of 7 cm below impeller wherein bubbles generated at the trailing edge of impeller are prevented from being quickly discharged by allowing a dwell time within the gas-liquid mixture chamber, thereby gas bubbles are further affected by the impeller shearing force as well as the pressure differential between the gas pressure within the bubble and that of the water pressure. The above described results where achieved with the use of an aerator having a 5 cm diameter gas conveyance tube, a 4.3 cm diameter four bladed impeller having an angle of 6 degrees with an outward curved leading edge and an inward curved trailing edge, a shaft speed of 3250 rpm and aerator submerged to a depth of 30 cm.

Other impeller designs incorporating straight leading edge and trailing edge, as well as in combination with another impeller having principally vertical oriented blades and positioned below the primary vacuum inducing impeller, also achieved similar results. However these alternate impeller types required greater power draw due to increase resistance or drag forces.

Aerator performance is a product of the impeller pitch ratio or pitch angle and gas-bubble residence time within the gas-liquid mixture chamber. Understanding the relationship of impeller design characteristics allows the aerator to be placed at greater depths than the aerator characterized above and thereby discharge micro-sized gas bubbles deeper within the water column. The key parameters to consider are the relationships between; a) pitch angle, rotation speed, torque and b) gas bubble residence time within gas-liquid mixture chamber, which is controlled by distance from impeller gas-liquid interface and to gas-bubble discharge point.

A fundamental characteristic benefit with the use of the gas-liquid mixture chamber is that when the gas introduced into gas conveyance tube is pressurized and introduced above and proximal to impeller the gas-liquid mixture chamber provides a distance and residence time that enables the gas-bubble internal pressure to be lower than that of the liquid at the point of discharge from the gas-liquid mixture chamber. This process of using pressurized air allows the aerator to be of a submersible type and positioned deeper into the water column. In addition impeller pitch angle and torque requirements are similar as those applied with the low-submerged depth aerator. Tests have revealed that impeller pitch angle can be reduced since suction draw requirement are minimized with the use of pressurized gas.

The aeration method, as described in combination with aerator, increases oxygen transfer via the introduction of liquid having a lower dissolved oxygen concentration. Liquid can be conveyed directly into aerator or proximal to bottom of aerator. In addition can provide a method of controlled non-aggressive liquid mixing. Liquid conveyed can be intermittent and in addition transport various soluble carriers such as ionic compounds, bio-active agents and/or catalyst.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. An aeration method comprising the steps of:
   providing an aerator that comprises:
      a gas conveyance tube having a gas inlet end and a gas outlet end;
      a substantially vertically oriented gas-liquid mixture chamber having an upper end with a gas intake opening that is in communication with the outlet end of the gas conveyance tube;
      at least one impeller affixed to a rotatable shaft and housed within and positioned near the upper end of the gas-liquid mixture chamber below the gas intake opening, wherein rotation of the at least one impeller creates a low-pressure zone or vacuum which draws gas from the gas intake opening at the upper end of the gas-liquid mixture chamber;
      at least one gas bubble discharge opening positioned at a bottom end of the gas-liquid mixture chamber; and
      at least one liquid intake at the bottom end of the gas-liquid mixture chamber providing all liquid intake to the gas-liquid mixture chamber;
   submerging the gas-liquid mixture chamber into a body of liquid;
   activating rotation of the shaft to which the at least one impeller is affixed, whereby rotation of the at least one impeller creates the low-pressure zone or vacuum that allows gas introduced into the gas conveyance tube to be drawn into the upper end of the gas-liquid mixture chamber;
   generating gas bubbles via the rotation of the at least one impeller wherein the gas from the upper end of the gas-liquid mixture chamber is brought into contact with the rotating impeller;
   forcing the gas bubbles to move downward in a radial and helical motion within the gas-liquid mixture chamber via the rotating action of the at least one impeller;
   confining the radial and helical downward motion of gas bubbles within the gas-liquid mixture chamber whereby the shearing action of the at least one rotating impeller and incoming liquid entering the bottom end of the gas-liquid mixture chamber produces gas bubbles that are predominantly less than 0.85 millimeters in size; and
   discharging the gas bubbles via the at least one discharge opening at the bottom of the gas-liquid mixture chamber into the body of liquid with minimum turbulence and wherein incoming liquid is drawn into the gas-liquid mixture chamber by suction created by rotation of the impeller, and the incoming liquid entering at the bottom end of the gas-liquid mixture chamber is of a greater pressure than the internal gas bubble pressure.

2. The aeration method of claim 1, wherein the gas inlet end of the gas conveyance tube is not submerged and is in communication with a source of atmospheric gas whereby the atmospheric gas within the gas conveyance tube enters through the gas intake opening into the gas-liquid mixture chamber via the rotation of at the least one impeller.

3. The aeration method of claim 1, wherein the shaft to which the at least one impeller is affixed is rotated by a motor that is submerged.

4. The aeration method of claim 1, wherein gas introduced into the gas conveyance tube is pressurized gas and whereby the pressurized gas within the gas conveyance tube enters through the gas intake opening into the gas-liquid mixture chamber via the rotation of at the least one impeller.

5. The aeration method of claim 1, including a step of providing a liquid conveyance conduit having an inlet end and an outlet end, whereby liquid from the outlet end of the liquid conveyance conduit enters into a liquid intake opening of the gas-liquid mixture chamber as a result of a central suction vortex generated by the rotating impeller.

6. The aeration method of claim 5, wherein the outlet end of the liquid conveyance conduit is in communication with the liquid intake opening.

7. An aeration method comprising:
providing an aerator that comprises of:
gas conveyance tube having a gas inlet end and a gas outlet end;
a substantially vertically oriented gas-liquid mixture chamber having an upper end with a gas intake opening that is in communication with the outlet end of the gas conveyance tube;
at the least one impeller affixed to a rotatable shaft and housed within and positioned near the upper end of the gas-liquid mixture chamber below the gas intake opening, wherein rotation of the at least one impeller creates a low-pressure zone or vacuum which draws gas from the gas intake opening at the upper end of the gas-liquid mixture chamber;
at least one gas bubble discharge opening positioned at a bottom end of the gas-liquid mixture chamber;
submerging the gas-liquid mixture chamber into a body of liquid;
activating rotation of the shaft to which the at least one impeller is affixed, whereby rotation of the at least one impeller creates the low-pressure zone or vacuum that allows gas introduced into the gas conveyance tube to be drawn into the upper end of the gas-liquid mixture chamber;
providing a liquid conveyance conduit having an inlet end and an outlet end, whereby liquid from the outlet end of the liquid conveyance conduit enters into a liquid intake opening of the gas-liquid mixture chamber as a result of a central suction vortex generated by the rotating impeller, the liquid intake opening being positioned near to the bottom end of the gas-liquid mixture chamber;
generating gas bubbles via the rotation of the at least one impeller wherein the gas from the upper end of the gas-liquid mixture chamber is brought into contact with the rotating impeller;
forcing the gas bubbles to move downward in a radial and helical motion within the gas-liquid mixture chamber via the rotating action of the at least one impeller;
confining the radial and helical downward motion of the gas bubbles within the gas-liquid mixture chamber whereby the shearing action of the at least one rotating impeller and incoming liquid entering the bottom end of the gas-liquid mixture chamber produces gas bubbles that are predominantly less than 0.85 millimeters in size; and
discharging the gas bubbles via the at least one discharge opening at the bottom end of the gas-liquid mixture chamber into the body of liquid with minimum turbulence and wherein incoming liquid entering at the bottom of the gas-liquid mixture chamber is of a greater pressure than the internal gas bubble pressure.

8. The aeration method of claim 7, wherein the liquid conveyed is used as a carrier fluid for additives.

9. The aeration method of claim 8, wherein the additives include at least one of ionic compounds, bioactive agents or catalysts.

* * * * *